(12) United States Patent
Babb et al.

(10) Patent No.: US 9,591,028 B2
(45) Date of Patent: Mar. 7, 2017

(54) VISUALIZATION AND ANALYSIS OF COMPLEX SECURITY INFORMATION

(71) Applicant: McAfee, Inc., Santa Clara, CA (US)

(72) Inventors: Grant Babb, Beaverton, OR (US); Matthew Briercliffe, Coon Rapids, MN (US); Paul Diercks, Stillwater, MN (US); Robert P. Glamm, Blaine, MN (US); Kirby Koster, Lino Lakes, MN (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/780,533

(22) PCT Filed: Dec. 13, 2013

(86) PCT No.: PCT/US2013/074953
§ 371 (c)(1),
(2) Date: Sep. 26, 2015

(87) PCT Pub. No.: WO2015/047431
PCT Pub. Date: Apr. 2, 2015

(65) Prior Publication Data
US 2016/0205137 A1    Jul. 14, 2016

Related U.S. Application Data

(60) Provisional application No. 61/884,356, filed on Sep. 30, 2013.

(51) Int. Cl.
*G06F 11/00* (2006.01)
*H04L 29/06* (2006.01)
(Continued)

(52) U.S. Cl.
CPC .......... *H04L 63/20* (2013.01); *G06F 3/04842* (2013.01); *G06F 17/30572* (2013.01); *G06F 21/552* (2013.01)

(58) Field of Classification Search
CPC . H04L 63/04; H04L 63/0227; H04L 63/0236; H04L 63/20
(Continued)

(56) References Cited

U.S. PATENT DOCUMENTS 5,987,610 A   11/1999  Franczek et al.
6,073,142 A    6/2000  Geiger et al.
(Continued)

FOREIGN PATENT DOCUMENTS

WO    2012-150107    11/2012

OTHER PUBLICATIONS

Chen, et al., "Visualizing Evolving Networks: Minimum Spanning Trees versus Pathfinder Networks," In: IEEE Symposium on Information Visualization, INFOVIS 2003, Seattle, WA, USA, pp. 67-74, Oct. 19-21, 2003.
(Continued)

*Primary Examiner* — Hosuk Song
(74) *Attorney, Agent, or Firm* — Patent Captial Group

(57) ABSTRACT

In one example, a visualization data engine may be responsible for rendering the visualization data obtained from the backend data server and providing the user interface (UI) necessary to allow an administrator to analyze the data. An example UI may include the ability to filter, organize, reorganize, and choose the raw data to be transformed. The UI may also provide interactions that expand and compress sections of the dataset, drill into the underlying dataset that is represented to the user, and move the data from one visualization to another.

20 Claims, 11 Drawing Sheets

(51) Int. Cl.
*G06F 21/55* (2013.01)
*G06F 3/0484* (2013.01)
*G06F 17/30* (2006.01)

(58) Field of Classification Search
USPC ................. 726/11–14, 22–23; 713/150–154; 709/225–225
See application file for complete search history.

(56) References Cited

U.S. PATENT DOCUMENTS

| | | | | |
|---|---|---|---|---|
| 6,347,338 | B1* | 2/2002 | Segal | H04L 63/0218 709/229 |
| 6,460,050 | B1 | 10/2002 | Pace et al. | |
| 6,484,261 | B1* | 11/2002 | Wiegel | H04L 41/0856 715/763 |
| 6,658,472 | B1* | 12/2003 | Greaves | H04L 29/06 709/223 |
| 7,174,563 | B1* | 2/2007 | Brownlie | G06F 21/33 709/223 |
| 7,251,634 | B1* | 7/2007 | Foss | G06Q 10/107 705/64 |
| 7,506,155 | B1 | 3/2009 | Stewart et al. | |
| 9,311,502 | B2* | 4/2016 | Braddy | G06F 17/30867 |
| 2010/0313157 | A1 | 12/2010 | Carlsson et al. | |
| 2011/0134128 | A1 | 6/2011 | Hu et al. | |

OTHER PUBLICATIONS

Viau, et al., "The FlowVizMenu and Parallel Scatterplot Matrix: Hybrid Multidimentional Visualizations for Network Exploration," In: IEEE Transactions on Visualization and Computer Graphics, 2010, vol. 16, No. 6, pp. 1100-1108, Nov./Dec. 2010.

International Search Report and Written Opinion for PCT/US2013/074953 mailed on Aug. 27, 2014; 7 pages.

Labib et al., An Application of Principal Component Analysis in the Detection and Visualization of Computer Network Attacks, Department of Applied Science, University of California, 2004, 14 pages.

Das, et al., "An Efficient FPGA Implementation of Principle Component Analysis based Network Intrusion Detection System", Electrical Engineering and Computer Science Department, Northwestern University, 2008, 6 pages.

International Preliminary Report on Patentability in International Application No. PCT/US2013/074953 mailed on Apr. 5, 2016.

* cited by examiner

| EVENT DESCRIPTION CORRESPONDING TO MATRIX ROW | 1 | 2 | 3 | 4 | 5 | 6 | 7 | 8 | 9 | 10 | 11 | 12 |
|---|---|---|---|---|---|---|---|---|---|---|---|---|
| SUCCESSFULLY STORED/RETRIEVED DATA FROM FTP SITE | ▲ | ▼ | | | | | | | | | | |
| MAINFRAME BATCH JOB OR STARTED TASK START/STOP | | ▼ | | | | | | | | | | |
| SOCIAL NETWORKING USE-FACEBOOK | | ▲ | ▼ | | | | | | | | | |
| BUILT INBOUND/OUTBOUND UDP CONNECTION | | | ▲ | ▼ | | | ▼ | | ▼ | | | |
| WEBMAIL IN USE | | | | ▲ | ▲ | ▼ | | | | | | |
| BUILT INBOUND/OUTBOUND TCP CONNECTION | | | | | ▼ | ▲ | | | | | | |
| DENY CONNECTION DUE TO REVERSE PATH CHECK-IP SPOOF ATTACK | | | | | | ▲ | ▲ | | | | | |
| PROTOCOL ANOMALY-IP FRAGMENT OVERLAP | | | | | | | | ▲ | | ▼ | | |
| BUILT DYNAMIC/STATIC TCP/UDP/ICMP TRANSLATION | | | | | | | | ▼ | | | ▼ | |
| TEARDOWN TCP CONNECTION | | | | | | | | | ▲ | | | |
| WIRELESS-INTERFERING_AP_DETECTED | | | | | | | | | | ▲ | ▲ | |
| PROTOCOL ANOMALY-IP PACKET FRAGMENTED | | | | | | | | | | | | ▲ |
| INBOUND EXECUTABLE CODE | | | | | | | | | | | | ▼ |

FIG. 7B

| IP ADDRESS | PC1 | PC2 | PC3 |
|---|---|---|---|
| A | | 10 | |
| B | 81 | | |
| C | | | 11 |
| D | | | 3 |
| E | | | 3 |
| F | | | 12 |
| G | | | 19 |
| H | | | 25 |
| I | | | 3 |
| J | | | 18 |
| K | | | 31 |
| L | | | 1 |
| M | | | 4 |

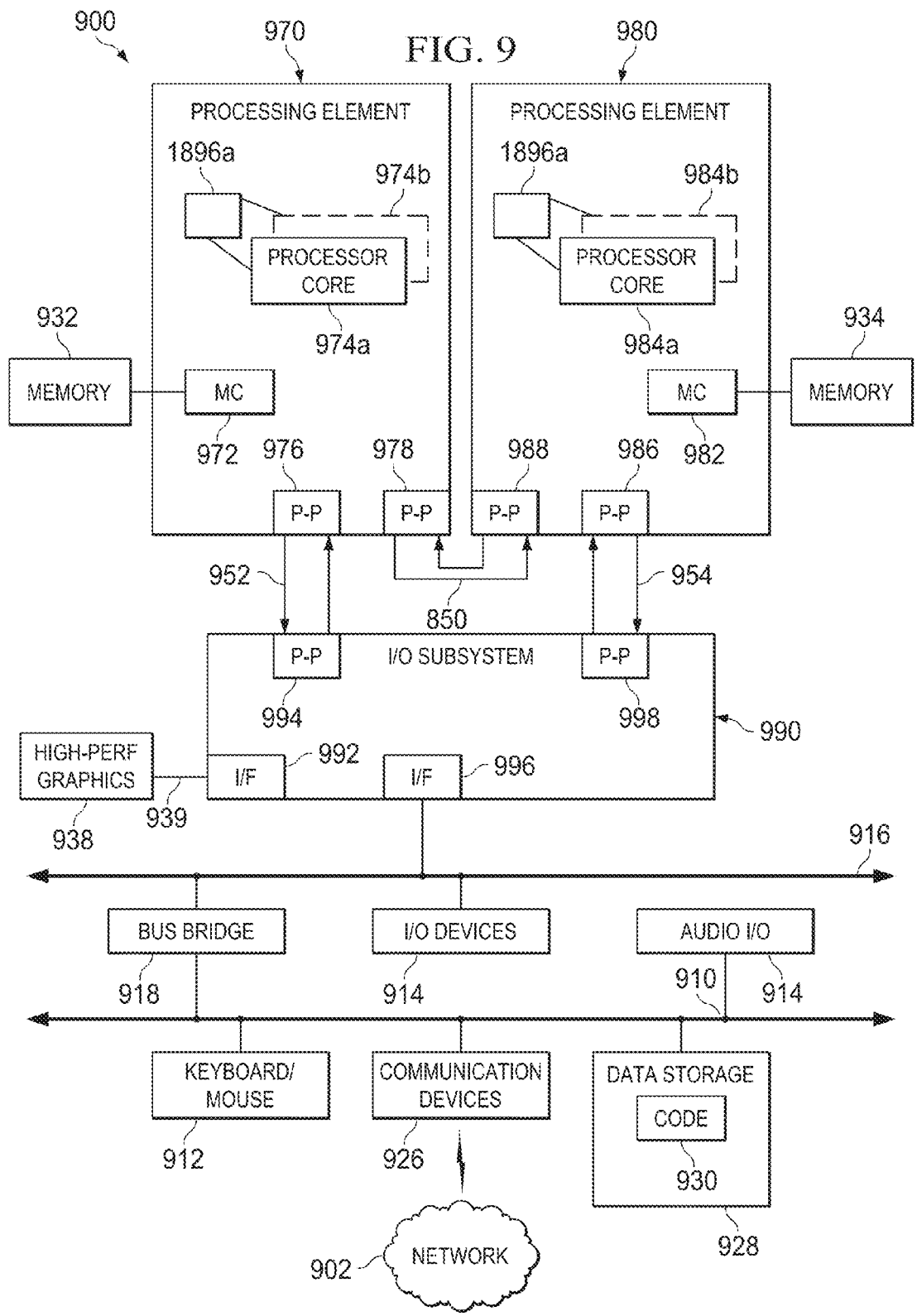

VISUALIZATION AND ANALYSIS OF COMPLEX SECURITY INFORMATION

PRIORITY DATA

This Application is a National Stage application under 35 U.S.C. §371 of PCT International Application Serial No. PCT/US2013/074953, filed on Dec. 13, 2013 and entitled "VISUALIZATION AND ANALYSIS OF COMPLEX SECURITY INFORMATION", which application claims the benefit of priority to U.S. Provisional Patent Application Ser. No. 61/884,356, filed on Sep. 30, 2013 and entitled "VISUALIZATION AND ANALYSIS OF COMPLEX SECURITY INFORMATION". The disclosures of the prior applications are considered part of and are hereby incorporated by reference in their entirety in the disclosure of this application.

TECHNICAL FIELD

Embodiments described herein generally relate to the field of computer security, and more particularly to visualization and analysis of complex security information.

BACKGROUND

Modern technology may provide the ability to process and store an immense amount of data. Making sense of this data poses challenges. Security products may create and collect data from endpoints, network devices, and transform and correlate it across the environment. These products may provide automation and structured data for machines to use.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7A-D illustrate different formats for showing a data set, according to one or more embodiments of the present specification;

FIG. 9 is a block diagram of an example computing system that is arranged in a point-to-point (PtP) configuration according to an embodiment.

DETAILED DESCRIPTION OF EMBODIMENTS

The human eye can take advantage of color, space, and motion to spot patterns or identify differences. A product that transforms security, "machine friendly" data into visual data may offer the ability to add human correlation into existing environments, increasing the value of security data. Human correlation may also allow an organization to more quickly spot patterns that identify an attack, and prioritize actions that reduce risk. In some cases, a security approach that doesn't take advantage of visualization may make detection data less credible because of the mathematical realities of security data.

Figure 1:
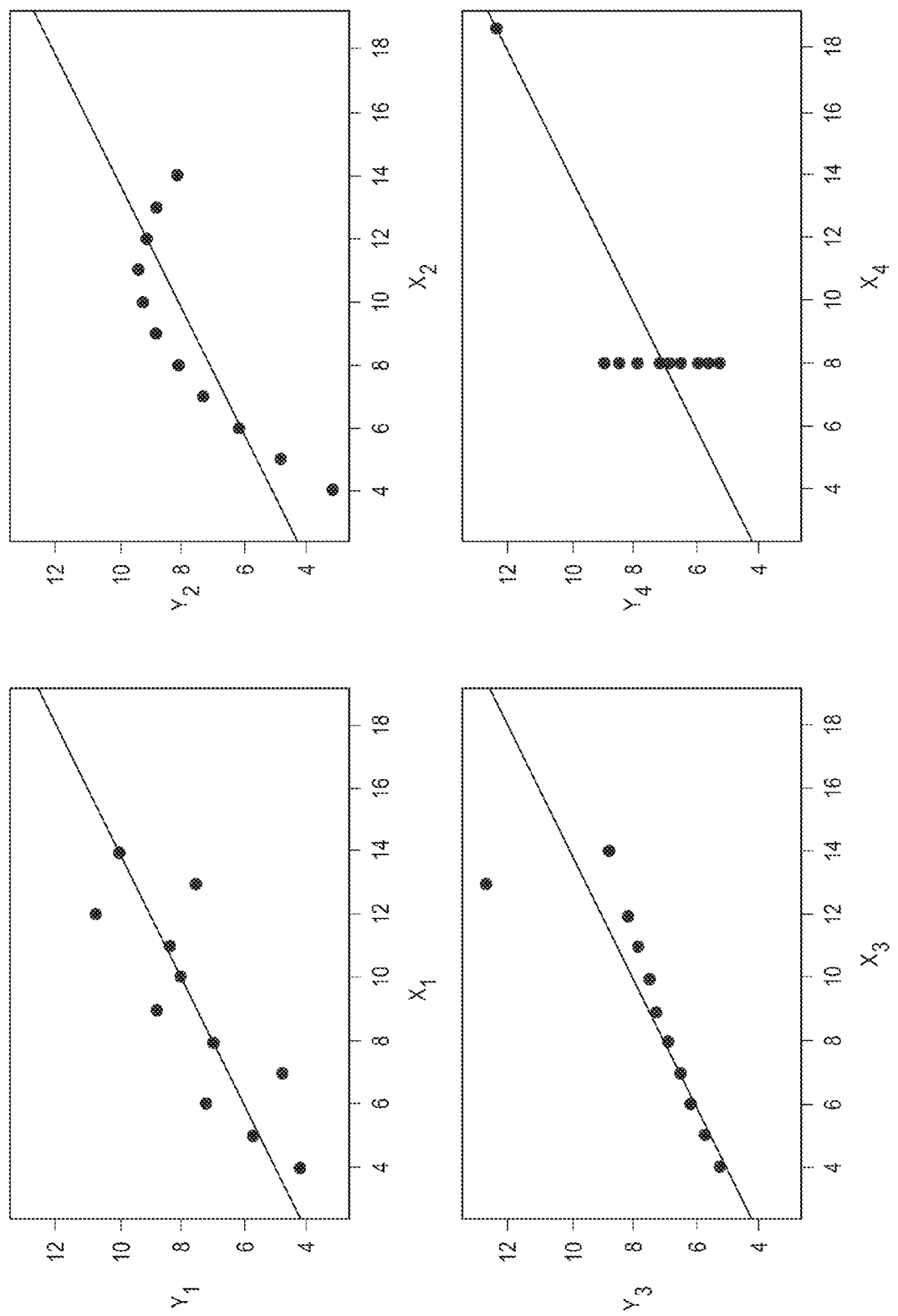
FIG. 1 provides an example graphical representation of four data sets.

For example, FIG. 1 provides an example graphical representation of four data sets. Each data set includes the same basic statistics. Machine correlation based on these measures may be inadequate to differentiate between these data sets, but a human may be able to quickly and easily visually differentiate them.

A large organization requires multiple security devices to secure its private network. During normal operation, these devices can generate informational events whose total reach billions per day. An organization will often choose a Security Information and Event Management solution to receive these events in a central location, aggregate them, and put them into a normalization taxonomy so they can be more easily analyzed by security personnel. This is intended to allow analysis of a smaller number of complex or aggregated events that is representative of the larger number of raw or simple events. The goal of analysis is an important one: identifying ongoing threats to information assets or operational issues that may impact the security of the network.

There is a significant challenge posed by the exponential growth of the events generated by security devices. Each generation of security device generates a greater number and variety of events. Network traffic continues to increase due to more devices on each network. As each device on a network can do more with increased processing power, the per-device contribution continues to increase as well.

Exponential data growth is not the only challenge. A second challenge comes from the human brain interpreting the data. Some studies has shown that the brain can only distinguish seven pieces of uni-dimensional information at a time, plus or minus two. The security analyst or operator cannot review the entire dataset produced by all the security devices on the network. They need only the most relevant data needed to do their job, identify potential security holes and identify any actors seeking to exploit those security holes. If a system is attempting to use event sets to characterize malicious behavior, it must have some way to eliminate false positives or similar noise to an acceptable level. A fire alarm that rings continuously does not meet its intended purpose.

Visual analytics are implemented in both security vendor software and general visual analytics software. Security vendor software may use conventional chart types, and adds additional dimensions of information by putting more charts on the page, i.e. dashboards. When it comes to displaying relationships in the data, the focus of some example systems is on network topology, but not topology in general. Security data contains much more relationships to be analyzed than how it travelled through a company network.

General visual analytics software may offer more ways to solve the problem, but may require all parts of the analytics task to be completed by the user. It may also require the user to be both an expert in the data being visualized and the tools of visual analytics. Visualizations may be limited to one chart or map at a time. Some users of security software are rarely experienced in scientific (general-purpose) visual analytics software.

Infographics are stylized applications to answer one line of questions but in some examples are not reusable. Time as a dimension may left out. Infographics may contain certain specific dimensions, which may be limited to the specific problem being represented. They may also contain a certain level of interactivity.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

The goal is to summarize a large number and variety of events with as few events as possible. These would then be passed to a security operator or analyst who could review a visualization of the reduced dataset for improved decision-making. A successful summarization of the data could be reversed to provide a reconstructed dataset that would match up with the original data with some acceptable error. Principal Component Analysis (PCA) is a method to reduce the dimensionality of a data set having of a large number of interrelated variables, while retaining as much as possible of the variation present in the data set. As these dimensions are reduced, they are compressed into fewer dimensions that do not have the same meaning they did in the larger data set. The dimensions are also now ordered so that the first few retain most of the variation present in all of the original variables.

Besides implementing PCA, the visualization of the data or a filtered version of the data provides an improved way for a user to understand the data. Instead of showing the data in a tabular form, or in a chart, the visualization technique implements an algorithm for providing a force-directed node graph using an energy function. Such a visualization technique enables a user to visually understand the data better, and improves how a user may deduce correlations between data.

In one example, a visualization display engine may be responsible for rendering the visualization data obtained from the backend data server and providing the user interface (UI) necessary to allow an administrator to analyze the data. An example UI may include the ability to filter, organize, reorganize, and choose the raw data to be transformed. The UI may also provide interactions that expand and compress sections of the dataset, drill into the underlying dataset that is represented to the user, and move the data from one visualization to another.

According to one or more embodiments of the present specification, the present specification provides a combination of software components that access data from other security products, then transform it using techniques like aggregation, correlation, and hierarchical organization. The resulting complex dataset may then be transformed into another dataset that is optimized for visual analysis. Following the application of special methods like self-organizing maps or an energy function, the visual-ready dataset may be rendered to a browser. The application component provides a choice of interactions for the user to explore or arrange the visual data.

In one embodiment, the present specification describes a solution for providing intelligent suggestions in visualizing network security data. The overall system not only provides ways for reducing the data set and providing a user interface for visualizing the data set, the analytics also provide a way to guide the user through the analytics process. The solution includes a data access layer for retrieving the network security data from a data source, for example, from a Security Information and Event Management solution. A graphical user interface renders the network security data for display on a user interface as a force-directed node graph using an energy function. The visualization data engine may provide the positions of the nodes using the energy function. Furthermore, the visualization engine may apply principal component analysis on the network security data to identify one or more principal components of the network security data. To guide the user through the analysis process, the user interface may output a message to the user suggesting a filter based on the one or more principal components of the network security data.

Security Data Visualization System

The approach of the example network security data visualization system is to implement a set of visual models (known as charts, maps, graphs) that interact with each other and the user. Special functions are provided to allow the user to analyze multiple levels of data, take advantage of intelligent suggestions from the system, and view potentially hidden relationships in data. These features allow a user tie together analysis steps across different visualizations of data; analyze multiple relationships in data at each step; and allows usage by one in the security domain rather than someone trained in visual analytics software use.

Figure 2:
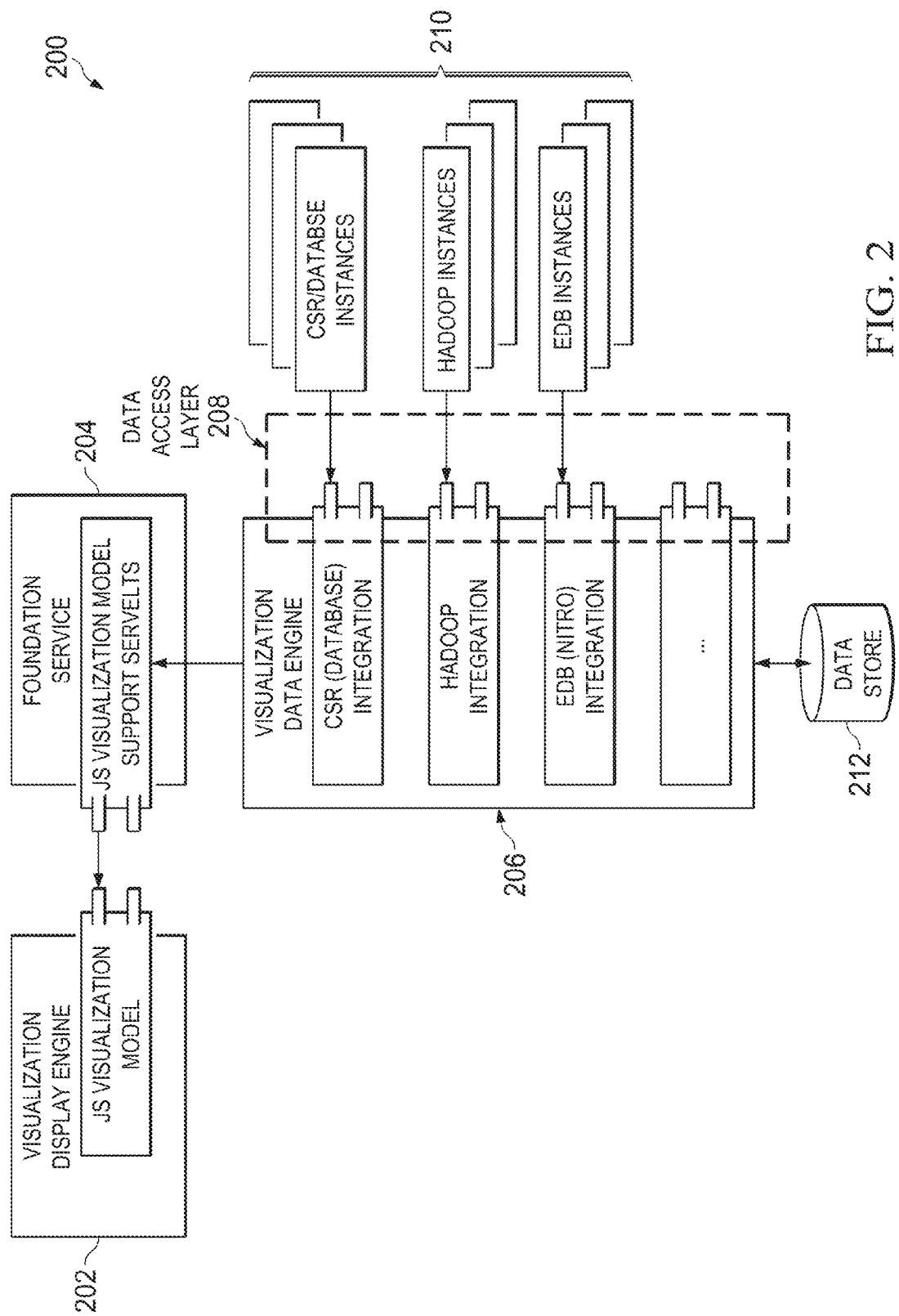
FIG. 2 is a block diagram of an embodiment of a security data visualization system according to one or more embodiments of the present specification.

According to an aspect a set of software components that aid human decision making with visual analytics. FIG. 2 is a block diagram of an embodiment of a security data visualization system according to one or more embodiments of the present specification. In this example, a Web-based framework is provided allowing a user to view the data and visualizations of the data through a Web browser. The network security data visualization system 200 comprises visualization display engine 202, foundation service 204, visualization data engine 206, a data access layer 208, data sources 210, and data store 212.

Visualization display engine 202 may be configured to render the visualization data obtained from the backend data server, such as data from the visualization data engine, and to provide the user interface for allowing a user to analyze the data. An example user interface may include the ability to filter, organize, reorganize, and choose the raw data to be transformed. The user may also provide interactions that expand and compress sections of the dataset, drill into the underlying dataset that is represented to the user, and move the data from one visualization to another. The user interface may also provide intelligent suggestions as output to the user. An exemplary implementation of visualization display engine 202 may utilize technologies, such as WebGL JSP, Javascript, etc., for generating interactive 3D or 2D graphics to render a force-directed node graph for display based on movement/position information computed by visualization data engine 206.

Foundation service 204 may be configured to provide basic services for providing a Web-based framework. Foundation service 204 may include library to provide the base services needed for the visualization engine including a Web based application container, login/authentication mechanism, menu system, access controls, etc. In an example, foundation service 204 includes an existing SQL query engine that can provide initial access to data from other products.

Visualization data engine 206 performs the computations for the energy function such that movement and position data can be calculated based on a set of data points. Furthermore, visualization data engine 206 performs the principal component analysis for reducing the data set's dimensionality. According to one aspect, visualization data engine 206 may provide a data model needed for the visualization display engine. Visualization data engine 206 may have the ability to support a layer for data rollup, aggregation (when/if needed for performance), and multi-component data analysis for intelligent data organization and filtering.

Data access layer 208 may provide a plugin framework that allows visualization data engine 206 to support multiple types of heterogeneous data sources, such as data sources 210, over time. Data sources 210 may include at least one of: SQL (e.g., CSR/Database Instances), Hadoop, McAfee EDB (from McAfee Enterprise Log Manager). This may support improved data flexibility and deployment models (on-prem, cloud, appliance, etc.) and future proofs the solution for future data trends.

In some embodiments, visualization data engine 206 is configured to collate and process data from the plurality of different data sources 210, which may store network security data in different formats and structures. In some instances, data sources 210 may each log different types of events as network security data. Based on the data from the different data sources, visualization data engine 206 may process the data such that it is suitable for visualization and/or principal component analysis.

Data store 212 provides storage for data being generated by visualization data engine 206, such as filtered network security data.

Features of Visualization Display Engine

While the visualization data engine performs most of the data processing and analysis, the visualization display engine may provide one or more features which allows the user to manipulate and interact with a user interface to view the network security data in different ways.

More than one data view for each data set provides a spectrum of ways for a user to analyze the complex network security data. At least one view useful for hierarchical data may be available, and one view useful for high cardinality data (like network addresses or IP addresses) may be available.

A visualization display engine may provide self-organizing data views. Making patterns easier to detect by users involves placing things that have something in common closer together within the visualization. This takes advantage of human perceptions (Law of Proximity) to make these connections based on spatial arrangement. The visualization data engine may have the ability for all the entities on the screen to appear organized according to how similar or dissimilar they are, such as through the use of an energy function to generate a force-directed node graph. The visualization display engine may then render the force-directed node graph for display (while the visualization data engine may compute motion and position information for rendering the force-directed node graph for display). As the user selects different filters or reorders the priority of the dimensions being viewed, the layout will be recalculated and the view will automatically update.

Critical to the analysis of patterns is looking at data along the dimension of time since the detection of fraud, advanced persistent threats, zero-day activity, etc. is heavily dependent on looking at data as it develops over hours, days, weeks, or months. The visualization display engine may have the ability to visualize data with time as a dimension.

When analyzing a large dataset for hidden or unexpected patterns, a lot happens by changing perspective. In the visual sense, this means looking at the same data while interchanging dimensions, colors, shapes, and view types. The visualization display engine may include n logic that converts lists, numbers, network addresses (IP addresses), etc. into mapped values which can be used as dimensions or entities or both.

The visualization data engine may give the user the ability to navigate through very large datasets. Starting from a high level overview the user must have the ability to filter and zoom into intermediate visualizations for analysis and then finally down to the actual details for a smaller number of data points.

To allow for a visualization to be loaded later for additional analysis or to be presented in an offline format, the visualization engine may provide the ability to export and import both the visualization data itself as well as the metadata used to create the originally saved view of the data into a locally saved data file.

In one embodiment, the system implements a novel interactive function for visual analytics, which allow the user to explore data in a visual context instead of navigating a tabular representation of the data. Non-limiting examples of this interactive function include the ability to highlight one chart to filter the data in another, switch the same dataset across different chart types, use time as a dimension or a filter or as a "play back" data. The way these interactions "glue" together the features into an analysis workflow is novel for this system.

The system implements a novel concept of classifying and displaying information as organizers, overlays, or filters. Each attribute in a dataset is classified as an organizer, overlay, or filter. An attribute can have more than one of these classifications. These classification types, respectively: allow an attribute to have the effect of re-organizing the data in terms of that attribute; impacts the size, shape, color, or labeling of an entity in the chart; adds or removes part of the dataset to simplify or deepen the visual dataset being analyzed.

To provide a solution which works for large organizations that collects a large amount of data on the network, the visualization display engine may preferably scale to 100,000 data points.

Exemplary Node Graph with Group-in-a-Box Function

Figure 3:
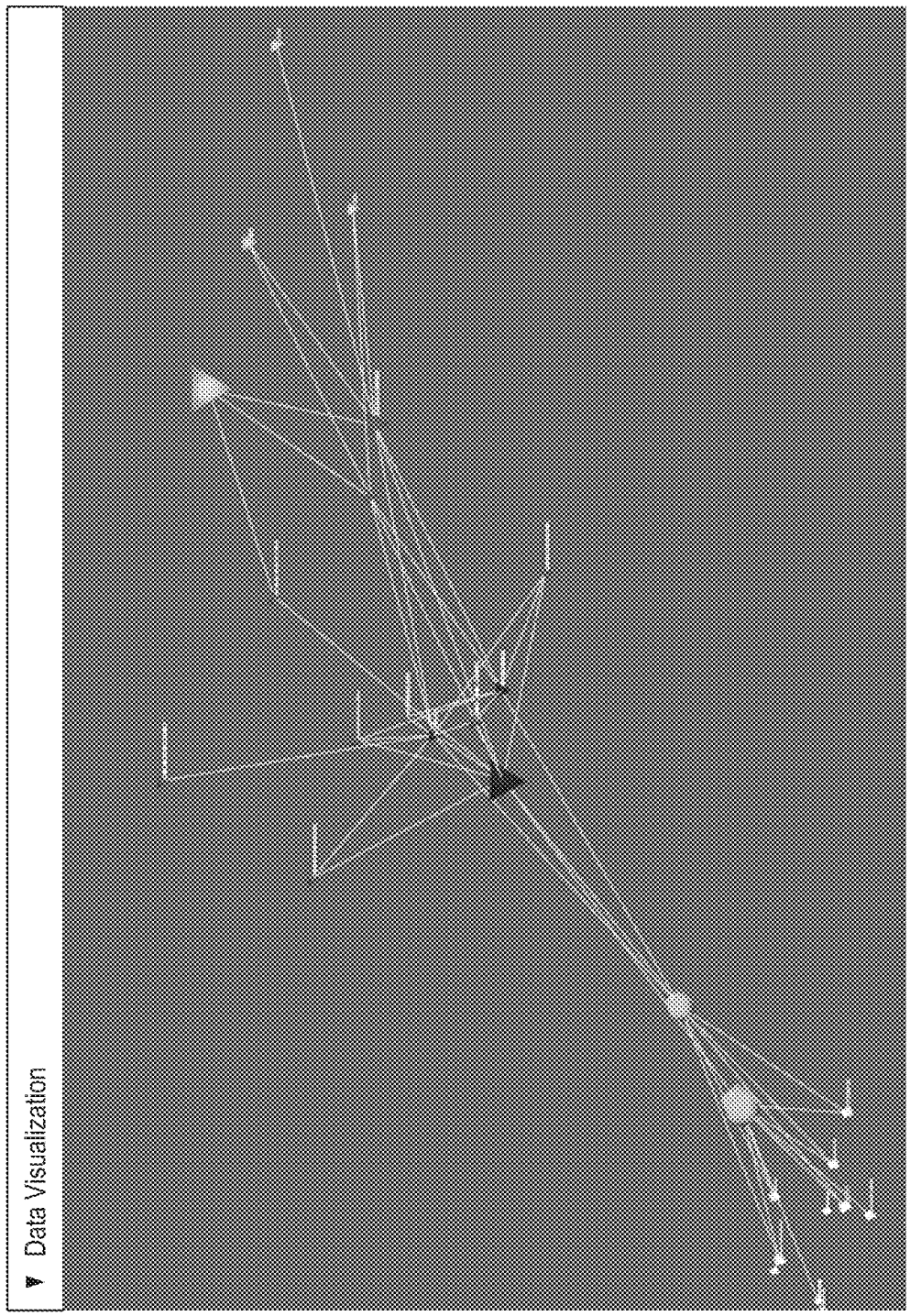
FIG. 3 is a node graph implementing an energy function according to one or more embodiments of the present specification.
Figure 4:
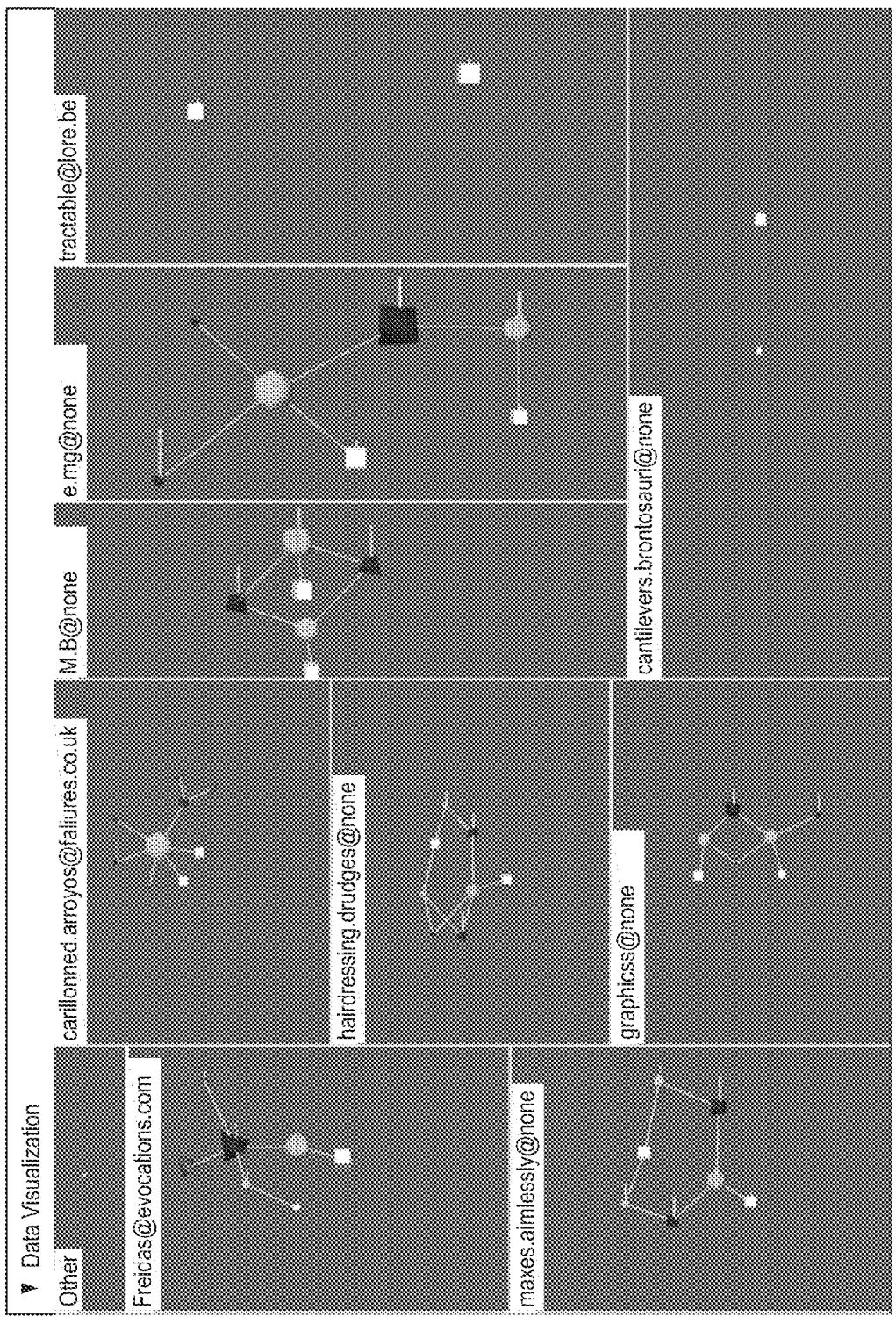
FIG. 4 provides an example group-in-a-box function of the data of FIG. 3 according to one or more embodiments of the present specification.

FIG. 3 is a node graph implementing an energy function according to one or more embodiments of the present specification. FIG. 4 provides an example group-in-a-box function of the data of FIG. 3 according to one or more embodiments of the present specification. Group-in-a-box functions may allow the user to nest conventional and experimental visualizations inside a hierarchy of information. This allows additional levels of information in the dataset to be displayed in the same page, and it allows more relationships (connections) to be seen in the data as it is compared over those hierarchies of information. This function meets a user's desire to organize data over an arbitrary axis, such as where a system is located, in addition to the data that comes from the device to be analyzed. This can also be seen as organizing by context in a visual layout.

Energy Function as a Visualization Algorithm

The system may implement the concept of an "energy function" as a visualization algorithm. This visualization algorithm can sometimes provide more meaningful information through a force-directed node graph when compared to data in a tabular form, or data in a chart form. To render the force-directed node graph, the energy function may take network security data or filtered network security data as input. Though the algorithm, proper movement and position information can be computed and the data points of the data can be rendered as a force-directed node graph.

In the node graph visualization, there is a "force" contained by each of the data points in the network security data, making it behave like a physical "particle." If the algorithm determines that two particles are different, then they repel each other and appear further apart from each other in the visualization (i.e., the position information for the two data points would render the two data points to appear further apart from each other). If two data points are related or similar (direct relation in the data or outcome of some arbitrary computed distance) then the particles attract each other and appear closer in the system. This collection of attractive and repellant forces translates to motion and distance in the visualization, which are qualities that the human brain readily perceives. This has the effect of transforming arbitrary or complex relationships in data into qualities that the humans can more rapidly understand.

Pseudocode of an embodiment follows, where the embodiment illustrates the procedure for computing motion and position information for each data point in the network security data (or a filtered network security data).

```
1. Particles mutually repel each other. Each particle applies a repelling force to every other particle.
        for each (particle in particle_array)
        particle = -1 // negative is repelling
2. Connecting edges result in an attractive force being applied to both particles (i.e. edges pull two individual particles together.)
        relationshipmap = run subroutine singularvaluedecomposition
        // calculate attributes with most variance and contribution of variance
            OR
        relationshipmap = run subroutine nearest_neighbor
        //calculate cluster distance of each attribute
            OR
        relationshipmap = run node_inspection
            // identify direct relationships of the model
            //isRelated uses relationshipmap object to compare specific particles
        if particle(n).isRelated(particle(n+1)) then particle(n) ++; paticle(n+1) ++
            //related makes them more attractive
3. Once forces have been computed for all particles, velocity and the resulting changes in position for every particle are computed.
        for each (particle in particle array)
            particle.currentPosition = resultingforce(particle, particle_array)
            position_change = particle.lastPosition - particle.currentPosition
            particle.velocity = position_change/(current_time-last_time)
4. The next frame (with the new particle positions) is drawn on screen.
        old_particle_array = current_particle_array;
        current_particle array = particle_array
        drawParticles(current_paricle_array);
5. If the resulting particle position changes are (roughly) zero, stop; otherwise, restart at step #1.
        position_change_array = compare(old_particle_array, new_particle_array)
        for each (position in position_change_array)
         if abs(position) > tolerance goto 1
```

The energy function providing the force-directed node graph is based loosely on the Fruchterman Rheingold (FR) method. The FR method combines attractive forces, modeled on a dampened spring, with repulsive forces, modeled on electrostatics or charged particles. Accordingly, the energy function comprises model equations for modeling these "electrostatic forces" between the data points.

However, instead of using the common approach of using approximations and continual updating of the nodes and edges, the visualization data engine uses the model equations, partial differential equations, and ordinary differential equations to determine the motion and position of nodes in the graph. These equations are solved using 3-D Fast Fourier Transformations (FFT). This improved energy function has the effect of reducing the order of complexity of a conventional FR graph from O(n3) to O(n log n).

The following illustrates the model equations, partial differential equations, and ordinary differential equations used in the energy function.

Electrostatic (repulsion) forces:

$$\nabla^2 u(r,t) = F(r)$$

$$F(r) = \sum_{k=1}^{n} q_k \delta(r - r_k)$$

-continued $$\nabla^2 = \frac{\partial d^2}{\partial x^2} + \frac{\partial d^2}{\partial y^2} + \frac{\partial d^2}{\partial z^2}$$

F(r) is the charge density function, where n = number of charges (number of nodes) and $r_k$ is the position of charge k. $q_k$ is the charge on each node, which can be a default value of −1 or a
value determined by PCA.

Dampened spring (attraction) forces:
$\nabla^2 r(t) + \beta \nabla r(t) + Ar(t) = W(r,t)\nabla u(r,t)$ $$\nabla^2 = \frac{\partial d^2}{\partial x^2} + \frac{\partial d^2}{\partial y^2} + \frac{\partial d^2}{\partial z^2}$$

$$\nabla^2 = \left(\frac{\partial d}{\partial x}, \frac{\partial d}{\partial y}, \frac{\partial d}{\partial z}\right)$$

A and β are constants that can be adjusted in the model depending on desired initial conditions
or graph properties.
W(r,t) is a weighting function that can reverse the behavior of the electrostatic and damped oscillator parts of the model or it can weight one side of the model more heavily than the other.
∇u(r, t) is the gradient of the electrostatic potential of each particle, while r(t) is the position vector for the damped spring. The balancing of these two forces positions each node.

The following is the algorithm to position each node and edge in the layout.

```
for t = start to end
\\ electrostatic force—repulsion from center and between nodes
   \\ calculate charge density
   function discretize charge on grid(x,y,z);
   for each charge
      charge(x,y,z) = weight*−1;
      charge_vector.add(charge(x,y,z));
   end \\ spectral solve poisson equation
   reshape_charge_vector;
   u_potential = fftn(charge_vector)/K;
   grad_vector = function gradient_u; \\spectral FFT \\ solve damped oscillator ODE with grad_vector as the forcing function
   weight_vector = function_weighting(charge_vector);
   pos_vector = damped_spring(grad_vector,A,B,weight_vector);
   charge_vector = charge_vector+pos_vector;
   function draw_charges;
end
```

In some embodiments, the visualization using force-directed principal component analysis can also be used as an organizer of data, by weighting the charge density in the model.

General Features of Principal Component Analysis

The goal is to summarize a large number and variety of events with as few events as possible. These would then be passed to a security operator or analyst who could review a visualization of the reduced dataset for improved decision-making Principal Component Analysis (PCA) is a method to reduce the dimensionality of a data set consisting of a large number of interrelated variables. As these dimensions are reduced, they are compressed into fewer dimensions that do not have the same meaning they did in the larger data set. The dimensions are also now ordered so that the first few retain most of the variation present in all of the original variables.

A successful summarization of the data could be reversed to provide a reconstructed dataset that would match up with the original data with some acceptable error. Principal Component Analysis (PCA) is a method to reduce the dimensionality of a data set consisting of a large number of interrelated variables, while retaining as much as possible of the variation present in the data set. As these dimensions are reduced, they are compressed into fewer dimensions that do not have the same meaning they did in the larger data set. The dimensions are also now ordered so that the first few retain most of the variation present in all of the original variables. PCA provides a useful technique both for error minimization and dimension reduction. As a measurement technique, PCA minimizes the actual (normal) distance from points to a set of basis that can represent the data. The Singular Value Decomposition is used to optimally reduce a matrix to a sum of rank-one matrices, of which a subset can be taken to obtain the smallest set of bases that can represent the dataset with an acceptable error. PCA provides a useful technique both for error minimization and dimension reduction. The PCA method follows these general steps:

1) Create a coefficient matrix from the data
2) Compute mean of data matrix
3) Center the data
4) Perform Singular Value Decomposition on the centered data matrix
5) Choose the number of singular values (dimensions) to retain for analysis.
6) Use the results to create a low-dimensional representation of the data.

Example

Applying a Combination of Principal Component Analysis, Force-Directed Node Graph Visualization, and Intelligent Suggestion PCA with visualization of the data illustrates the novel concept of classifying and displaying information as a filter. It is noted that applying PCA to the network security data is not trivial. In particular, a data scientist must evaluate the nature of the network security data and apply the PCA algorithm correctly to achieve the benefits of PCA. Generally speaking, network security data may include one or more of the following: machine asset information, network topology, reputation data, traffic logs, real-time event streams, malware detection data; employee records and organizational data.

The following illustration applies PCA in a novel manner to network security data comprising event counts organized by a network address, such as an IP address. The data may be exported from a commercially available security product which reports that aggregate event counts by a network address (e.g., an Internet Protocol (IP) address). The network address is the common unit used to describe a machine. One host may use multiple IP addresses, or one IP address may be the address of multiple virtual hosts. While it may not be the accurate starting point in dividing up network traffic, it represents the most effective way of doing it. Some traffic may or may not contain a host name or other attribute, but all packets in almost all of today's networks will contain a source IP address and a destination IP address.

Specifically, the novel approach of this present specification follows the following steps designed to work with this network security data:
- creating a coefficient matrix from the network security data, the coefficient matrix being a m×n matrix, where m correspond to events and n correspond to network addresses associated with those events, and the coefficient for each network address and event combination is a number equal to the number of times the combination occurred in the network security data;
- computing mean of coefficient matrix;
- centering the network security data into a centered data matrix based on the mean;
- performing singular value decomposition on the centered data matrix; and
- selecting a number of principal components (which may vary) to retain for analysis.

There are m possible events occurring on n possible network addresses. Represented as a coefficient matrix, for each network address and event combination there is a $k_{m,n} \geq 0$, $k \in \tilde{\mathfrak{R}}$, nequal to the number of times that combination occurred in the original data. The result is an m×n integer coefficient matrix. For a single network address (IP address), there will be many events for which the count will be zero. This makes the matrix large and sparse. Also, this large and sparse data set can be very difficult for a human user to understand.

It is noted that the raw data from, e.g., data sources 210 of FIG. 2, may not necessarily be in the format that is suitable for the coefficient matrix. In some embodiments, visualization data engine 206 is configured to collate and process that raw data from the plurality of different data sources 210, which may store network security data in different formats and structures. Based on the data from the different data sources, visualization data engine 206 can process the data to compile the raw data into data that is suitable for the coefficient matrix. In particular, visualization data engine 206 may have logic which processes the raw data to generate a new data set where the raw data can be arranged in terms of events organized by network address (or IP address). This powerful feature of the visualization data engine 206 advantageously allows the data analysis to be performed across multiple data sources. Moreover, a user can use the visualization data engine 206 and visualization display engine 202 to draw correlations and relationships in data that resides in normally separate data sources (a feature which has not been done before).

As the entries of the coefficient matrix are not considered feature errors for this approach, the greater the range of values for each variable, the greater the relevance of that variable. To balance these contributions across variables, the coefficient matrix of the network security is shifted to center on the mean. To shift the origin, compute a column vector containing the mean of each row:

$$M = \frac{\sum_{j=1}^{m} A_o[j]}{m}$$

where $A_o$ is the original matrix Ao[j] is the jth row of the matrix with m rows. Next, center the data by subtracting the mean from all rows $A_c = A - M$ to obtain the centered data matrix A.

Let A be a real m×n matrix and l=min {m, n}. There exist orthogonal matrices U and V such that $A = UWV^T$, where $U \in \mathfrak{R}$ m×m, $V \in \mathfrak{R}$ n×n, and $W = \text{diag}[\sigma(1), \sigma(2), \ldots \sigma(l)]$. It can be shown that U is the matrix of eigenvectors corresponding to $AA^T$, V is the matrix of eigenvectors corresponding to $A^TA$, and the diagonal of W contains the square root of each eigenvalue of $AA^T$ (or $AA^T$). Therefore this method can be used to obtain two different minimally spanning orthogonal basis of the subspace in A. The orthogonal vectors in U and V are both examples of the Karhunen Loeve expansion. It is the orthogonal nature of these bases that allows them to minimize several important criteria, one of which is the least squares error, giving a reduced dimension of the data at the same time.

If the left singular vectors (columns of U) are used for a basis, and m>>n, this can result in a number of columns much larger than in A. To address this issue, instead of performing full singular value decomposition (SVD), perform reduced SVD with, e.g., the SingularValueDecomposition[ ] command in Mathematica, using the minimum dimension parameter. This reduced set takes advantage of the fact that l=min {m, n} and returns a left-singular matrix that is m×l (for this case, m×n, NOT m×m) instead. While this approach can use eigenvalues obtained from the eigenvalue decomposition, this approach can result in an easily perturbed matrix. The SVD command uses the QR decomposition, with Arnoldi iteration on a sparse matrix, which offers greater numerical stability.

The choice of variable for the rows and columns is yet another non-trivial aspect of applying PCA to the network security data. This feature affects both the magnitude of dimension reduction and the interpretability of the results. For instance, events were chosen as the m row variables and IP addresses as the n column variables in order to make m<<n for computing the reduced SVD. As SVD and other PCA steps change the meaning of the column variables, the choice of row variable is the variable most necessary for later interpretation. Events have a more tangible meaning; IP addresses are a more arbitrary concept.

A second, more subjective and non-trivial, consideration in dimension reduction is choosing the appropriate eigenvectors to retain, i.e., selecting a number of principal components to retain for analysis. Of the m eigenvalues found by SVD, many were 0. However, almost half were not. Since the goal is to reduce dimension to aid human interpretation of data, the approach involved taking a relatively small number of eigenvectors to make a small set of principal components (PCs) for analysis. For this purpose the number is preferably to be close to 7±2 or less, to address limitations on human capacity and ability to understand multidimensional information. However, the choice may depend on the variance of the network security data. In one example, the number of PCs chosen may be 12 or less, which for a particular data set used, those 12 PCs represented 93.0% of the variance. The number of PCs chosen may be 7 or less, which for the particular data set used, 7 PCs represented 84.4% of the variance. In some cases, the number of PCs can be chosen to be 9 or less. In yet some other cases, the number of PCs can be chosen to be 5 or less (e.g., 3). It is noted that the number of PCs ought to be selected in view of how much variance the set of PCs can capture. If the number of PCs are too low, the PCs may not capture a sufficient amount of variance of the data to provide meaningful results. If the number of PCs are too high, a human may have difficulty understanding the data having more than 7 or 9 PCs.

Figure 5C:
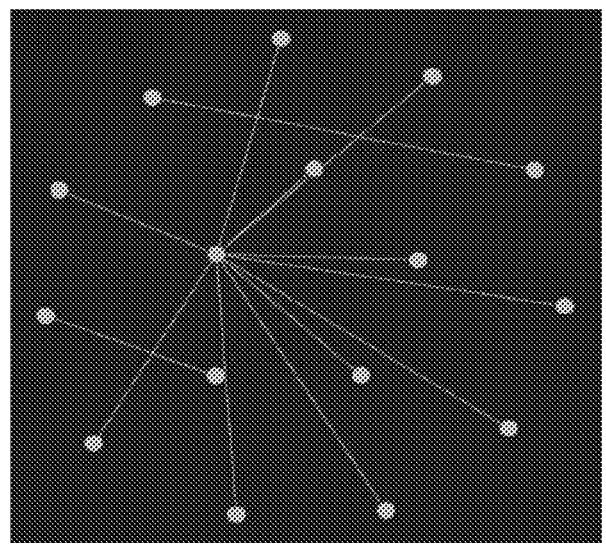
FIGS. 5A-C show an example of visualizing a data sets in three different ways: (1) a data set with no filter applied, (2) the data set filtered on seven principal components, (3) the data set filtered on three principal components, according to one or more embodiments of the present specification.
Figure 5B:
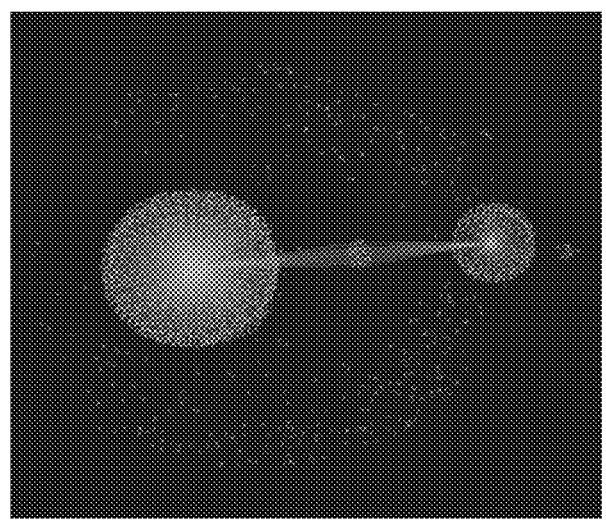
Figure 5A:
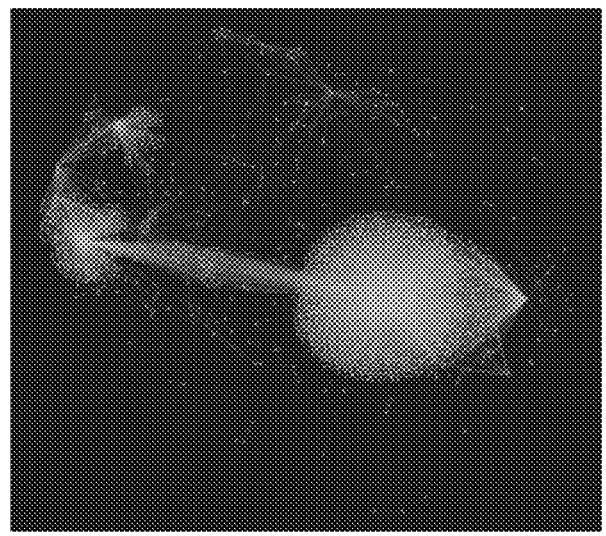

PCA is applied not only as a way to reduce the size of the dataset, but also as an aid in interpretation of the dataset. The force-directed node graph combines with the information provided by PCA to allow the user to more quickly and accurately interpret patterns and connections, compared to filtering and analyzing the raw dataset. Below is an example of the interpretation of the dataset, which is aided greatly by the force-directed node graph. FIGS. 5A-C show an example of visualizing a data sets in three different ways: (1) a data set with no filter applied (~10,000 nodes/edges), (2) the data set filtered on seven principal components, (3) the data set filtered on three principal components, according to one or more embodiments of the present specification. As shown through these figures, a user viewing these three graphs can grasp the effect of PCA and PCA's ability to reduce the dimensionality of a data set into something a human user can understand.

Figure 6:
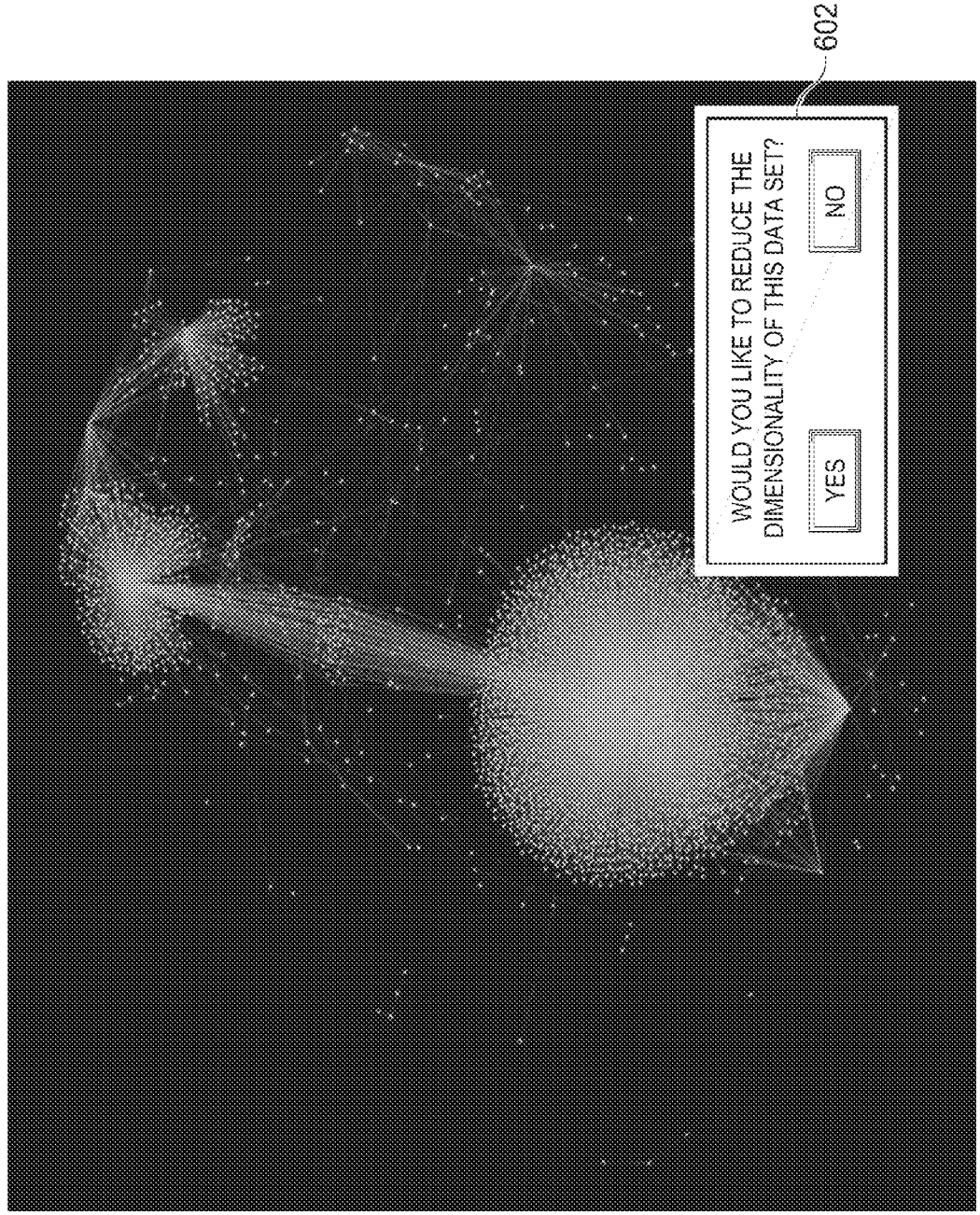
FIG. 6 shows an exemplary user interface providing an intelligent suggestion to a user, according to some embodiments of the present specification.

By applying PCA, a visualization data engine can assist the user in reducing the complexity of the force-directed node graph using one or more sets of principal components. The visualization display engine may provide a user interface comprising a message to intelligently suggest to the user the possibility to update the force-directed node graph with a force-directed node graph having a lower dimensionality. FIG. 6 shows an exemplary user interface providing an intelligent suggestion to a user, according to some embodiments of the present specification. As seen through the figure, message 602 shows a user interface element which prompts the user that it is possible to reduce the dimensionality of the data such that the data can become easier to interpret (e.g., such as the force-directed node graphs seen in FIGS. 5B-C). In some cases, data associated with the selected principal components may be highlighted to show the possibility of being able to reduce the data set.

The purpose of PCA was to reduce a large number p of variables to a much smaller number m of Principal Components (PCs), retaining as much as possible of the variation in the p original variables. The technique is especially useful if m<<p and if the m PCs can be readily interpreted. If m is very much smaller than p, then the reduction of dimensionality alone may justify PCA, even if the PCs have no clear meaning, but the results of PCA are much more satisfying if intuitively reasonable interpretations can be given to some or all of the m retained PCs.

According to one embodiment, the visualization display engine provides a user interface, where the user interface is configured to receiving a first user input indicating a first acceptance to the first message suggesting the first filter. For instance, a user may select an option to accept the intelligent suggestion and effectively requests the visualization data engine to provide a reduced data set using the first filter. The visualization data engine may generate or provide a first filtered network security data by filtering the network security data using a first set of one or more principal components of the network security data. Then the visualization display engine may rendering the first filtered network security data for display on the user interface as a second force-directed node graph using the energy function. In some embodiments, the unfiltered data and the first filtered network security data may be shown side by side for comparison. In some embodiments, the second force-directed node graph first filtered network security data replaces the first force-directed node graph on the user interface.

In some embodiments, the visualization data engine provides options for which principal components to retain for further analysis. Accordingly, different sets of principal components may be used for filtering the network security data. Users may be provided with different options to select between different sets of principal components, or the user may be provided with the opportunity to run the filter using successively less principal components to iteratively reduce the data set.

In one embodiment, the visualization data engine applies PCA to identify a second (different) set of principal components (or simply select a different set of principal components from the results of a previously performed PCA) and the visualization display engine outputs a second message to the user through the user interface suggesting a second filter based on the second set of principal components of the network security data. Upon receiving a second user input indicating a second acceptance to the second message suggesting the second filter, the visualization data engine may be caused to generate or provide a second filtered network security data by filtering the network security data using the second set of principal components of the network security data. The visualization display engine may then render the second filtered network security data for display on the user interface as a third force-directed node graph using the energy function.

In some embodiments, the unfiltered data, the first filtered network security data, and the second filtered network security data may be shown side by side for comparison In some embodiments, only the force-directed node graphs displaying the first filtered network security data and the second filtered network security data are shown side by side. In some embodiments, only the force-directed node graphs displaying the unfiltered network security data and the second filtered network security data are shown side by side. In some embodiments, only the force-directed node graph of the second filtered network security data is shown on the user interface.

An Illustration Using a Network Security Data Set for Visualizing Network Behavior Referring back to the network security data comprising event counts organized by IP addresses, a visualization data engine can transform the large dataset that made human analysis impossible into a visualization that can be easily understood. It is noted that using reduced singular value decomposition and principal component analysis accomplished a significant reduction in overall size, but did not leave the resulting data in a form that made human analysis easier: while a smaller matrix, it was now filled with very small values to several decimal places and one of the dimensions (IP addresses) no longer corresponded to its original meaning. For this reason, visualization using force-directed node graphs is implemented to aid interpretation of the new dataset.

Figure 7A:
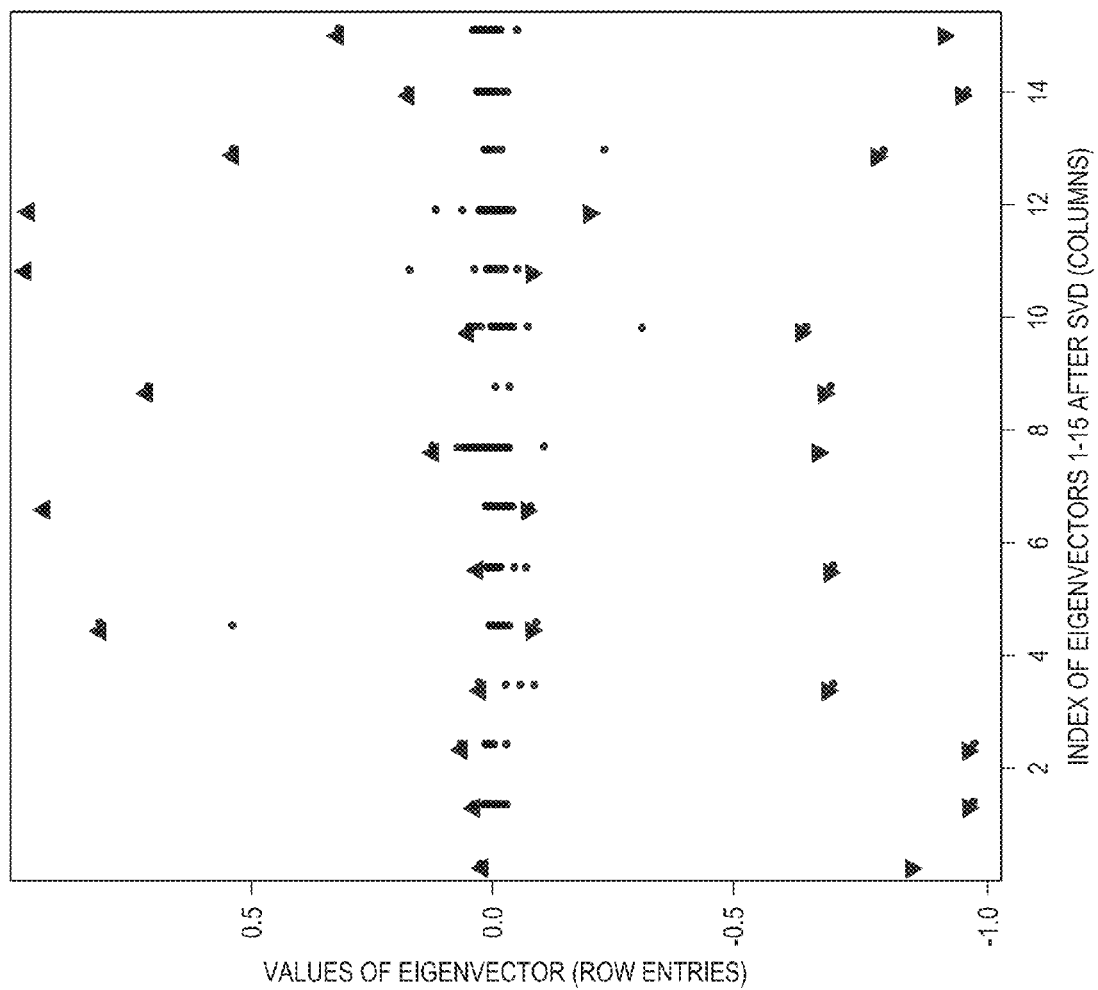

FIG. 7A-D illustrate different formats for showing a data set, according to one or more embodiments of the present specification. When interpreting PCs or other types of tabular data, it is usually only the general pattern that is really of interest, not values to several decimal places. To show this concept, the network security data set comprising of event counts organized by IP address is reformatted to highlight the general pattern in the dataset. FIG. 7A shows a scatter plot of the values of each eigenvector indicated that most of the eigenvector values were near 0, the maximum and minimum values were the most interesting values. The x-axis is the index value of the eigenvectors in the SVD set. The y-axis are the eigenvector values. The triangle marks pointing downwards marks the minimum value for each eigenvector; the triangle marks pointing upwards marks the maximum value. Highlighting the interesting values in the data meant marking the matrix entries that corresponded to the maximum and minimum values of each column. The original names of the rows (events) were added back, the rows that did not have marked entries were removed, and the values were replaced with blanks. The rows were sorted to improve usability, providing the final dataset for interpretation (FIG. 7B). The plot in FIG. 7A was used to mark the corresponding events (rows) in the dataset. Only matrix rows that contained maximum or minimum values for an eigenvector are retained, and the event that corresponded to the row is added to aid interpretation.

To test the summary as an interpretation tool, the events corresponding to maximum or minimum values in the first three PCs ("Successfully stored/retrieved data from FTP Site", "Mainframe Batch Job or Started Task Start/Stop", "Social Networking Use Facebook") are examined in the original data. Then the event counts in the original dataset were filtered to only those three event types. Using this small slice of data, the goal was to reach some conclusion about the data that would not have not been obvious without some prior knowledge.

The data set of FIG. 7B is reconstructed from summary data using first three PCs (PC1, PC2, and PC3). The table shown in FIG. 7C has a first column comprising relabeled IP addresses that sent events corresponding to the first three PCs. The first PC (PC1) had "store/retrieve from FTP site" as the maximum and "mainframe batch job stop/start" as the minimum (see column for PC1 in FIG. 7B). In the original data, this identified the two most unique machines on the network: 1) only one IP address performed FTP tasks (A, 10 events), and 2) there was only one computer on the network classified as a mainframe (B, 81 events). PC1 could be renamed "Most Unique Machine Behavior".

The second PC (PC2) had "store/retrieve from FTP site" as a minimum and "facebook use" as a maximum. The values as maximum or minimum tell the analyst that the expected "distance" between Facebook and FTP use on the network is the greatest. Therefore, if secondary analysis determined that a machine exhibited both behaviors, this could represent a potential security concern (possibly one user accessing Facebook, while a hidden user accessed the FTP site).

Figures 7C, 7D:
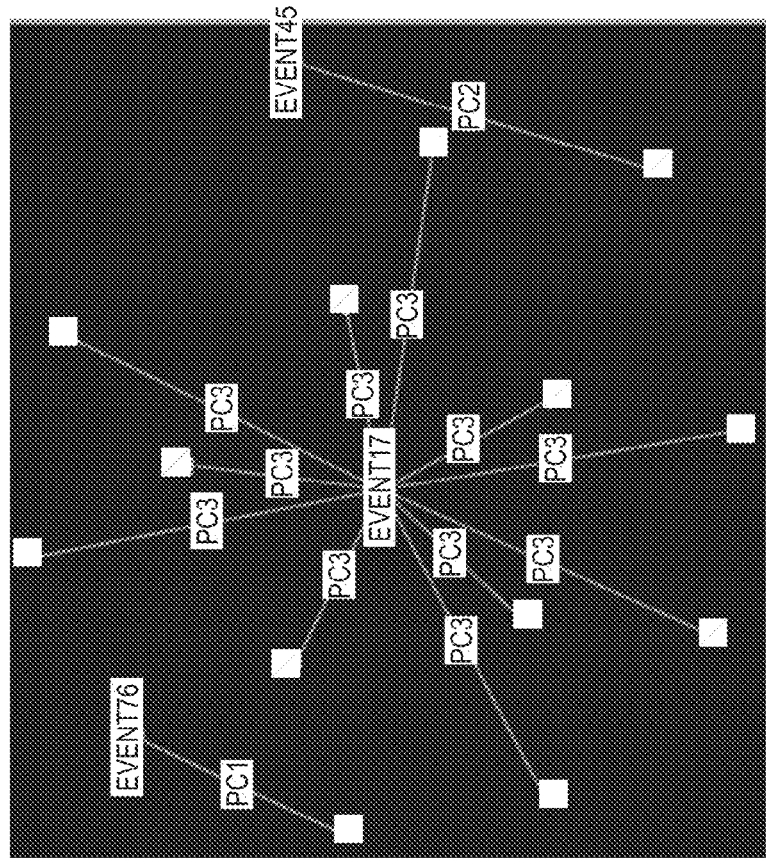

FIG. 7D shows a force-directed graph which visualizes the similarities and the differences in a meaningful manner, the same relationships are more obvious to the user, allowing to the user to reach the same conclusion in a more efficient manner. The secondary analysis is actually shown visually to the user, allowing the user to discern whether the data could represent a security concern. More importantly, these steps for converting the eigenvalue plot and reduction of data sets can be obviated using the network security data visualization tool, which performs the data reduction analysis in the visualization data engine and displays the results directly using the visualization display engine.

Intelligent Suggestion

The system implements a novel concept of intelligent suggestion. For a system that allows the user to choose what data is to be visually displayed, the system must also conduct analysis on the data, generate metadata with statistical descriptions of the attributes, and convey these observations in terms understood by the user. The system calculates metadata for potential attributes to be used in the dataset (variance or range as examples), which the system uses to provide messages to the user. These messages can include suggestions: to use this attribute as an organizer versus a filter; suggestions to use a pie chart versus a chord diagram; suggestions to use the attribute for higher level analysis versus detailed analysis, suggestions to reduce the data set's dimensionality, etc.

Two exemplary features in the system that implement intelligent suggestion are the cardinality-hierarchy suggestion, and the chart type suggestion. The cardinality-hierarchy suggestion identifies the cardinality of each level and places them in order of increasing cardinality. This is the preferred method for many graphs, and it removes the burden of the user first determining the cardinality of each level before the user begins to create a visualization. The chart type suggestion uses attributes of the data such as cardinality, total rows, and variance, to send the user interaction first to the chart type that is best suited for the data. Filtering by principal components (chosen as "first three" or "first seven" is an additional exemplary feature of intelligent suggestion detailed herein).

The visualization data engine may implement statistical methods (principle component analysis, variance analysis, etc.) and return the results based on these methods to the user as suggestions about next steps for analyzing the data. Using this technique, the user interface may highlight "good" choices for variables, dimensions, or the type of visualization to use. For example, if the user picks network address (IP addresses) as a dimension to view, the user interface of the visualization display engine might suggest a Fibonacci map instead of a Radial map.

System Illustrations

Figure 8:
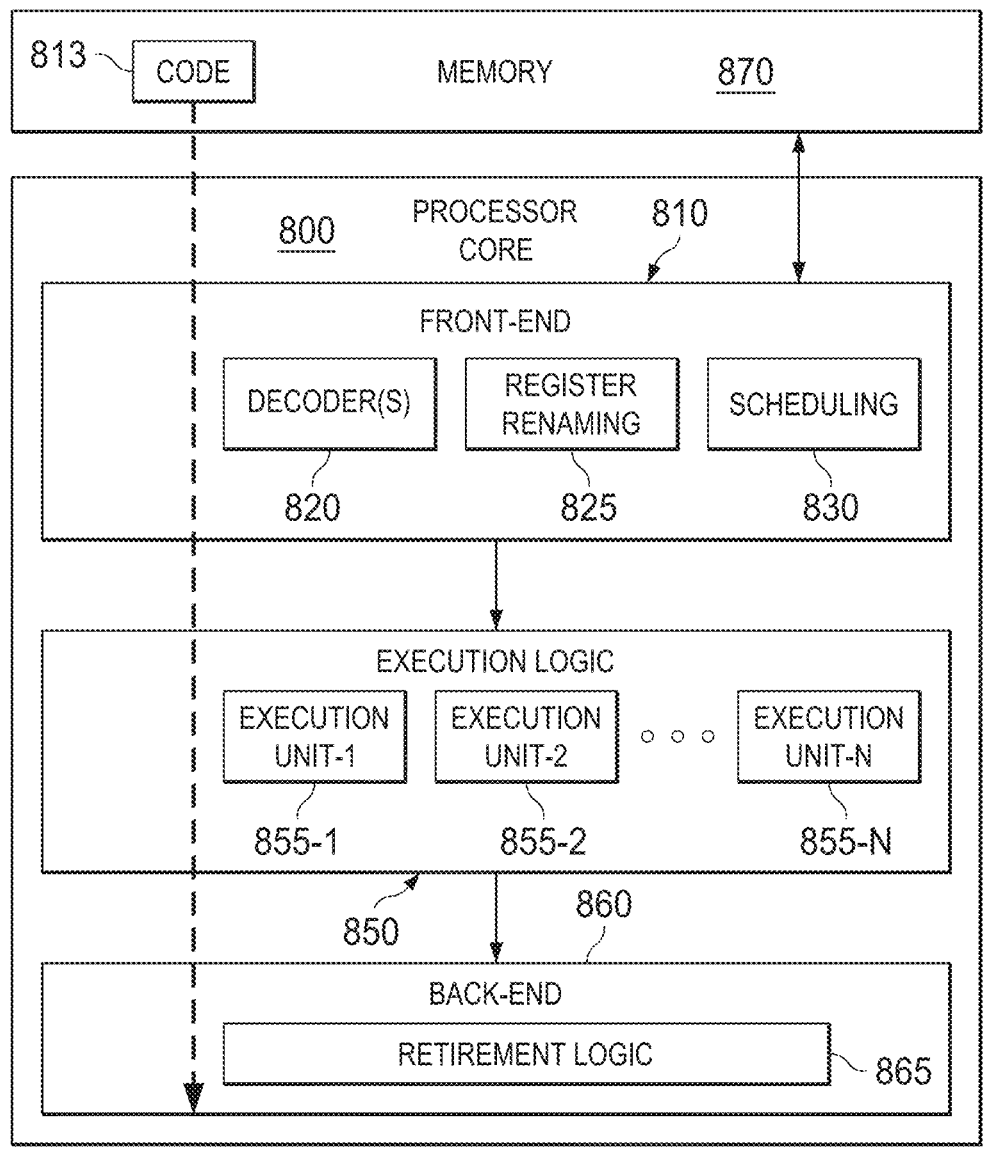
FIG. 8 is a block diagram of a memory coupled to an example processor according to an embodiment.

FIG. 8 is a block diagram of a memory coupled to an example processor according to an embodiment. FIG. 8 illustrates a processor core 800 according to one embodiment. Processor core 800 may be the core for any type of processor, such as a microprocessor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. (See, e.g., multi-core embodiments in FIG. 9, below). Processor 800 may be any type of processor, such as a microprocessor, an embedded processor, a digital signal processor (DSP), a network processor, a multi-core processor, a single core processor, or other device to execute code. Processor core 800 may be a single-threaded core or, for at least one embodiment, the processor core 800 may be multithreaded in that it may include more than one hardware thread context (or "logical processor") per core. Such cores 800 may be configured to execute instruction code in a manner disclosed herein. This system shown in FIG. 8 may be used to carry out the functions describe herein to be performed by visualization display engine, foundation service, visualization data engine, and any components shown in FIG. 2.

FIG. 8 also illustrates a memory 870 coupled to the processor 800. The memory 870 may be any of a wide variety of memories (including various layers of memory hierarchy) as are known or otherwise available to those of skill in the art. The memory 870 may include one or more code instruction(s) 813 to be executed by the processor 800 core. The processor core 800 follows a program sequence of instructions indicated by the code 813. Each instruction enters a front end portion 810 and is processed by one or more decoders 820. The decoder may generate as its output a micro operation such as a fixed width micro operation in a predefined format, or may generate other instructions, microinstructions, or control signals which reflect the original code instruction. The front end 810 also includes register renaming logic 825 and scheduling logic 830, which generally allocate resources and queue the operation corresponding to the convert instruction for execution.

The processor 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The execution logic 850 performs the operations specified by code instructions.

After completion of execution of the operations specified by the code instructions, back end logic 860 retires the instructions of the code 813. In one embodiment, the processor 800 allows out of order execution but requires in order retirement of instructions. Retirement logic x65 may take a variety of forms as known to those of skill in the art (e.g., re-order buffers or the like). In this manner, the processor core 800 is transformed during execution of the code 813, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic (see, e.g., MC 972 of FIG. 9, below) along with the processor core 200. The processing element may include I/O control logic and/or may include I/O control logic integrated with memory control logic. The processing element may also include one or more caches.

FIG. 9 is a block diagram of an example computing system that is arranged in a point-to-point (PtP) configuration according to an embodiment. Shown in FIG. 9 is a multiprocessor system 900 that includes a first processing element 970 and a second processing element 980. While two processing elements 970 and 980 are shown, it is to be understood that an embodiment of system 900 may also include only one such processing element. This system shown in FIG. 9 may be used to carry out the functions describe herein to be performed by visualization display engine, foundation service, visualization data engine, and any components shown in FIG. 2.

System 900 is illustrated as a point-to-point interconnect system, wherein the first processing element 970 and second processing element 980 are coupled via a point-to-point interconnect 950. It should be understood that any or all of the interconnects illustrated in FIG. 9 may be implemented as multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974, 974b, 984a, 984b may be configured to execute instruction code in a manner disclosed herein.

Each processing element 970, 980 may include at least one shared cache 1896. The shared cache 1896a, 1896b may store data (e.g., instructions) that are utilized by one or more components of the processor, such as the cores 974a, 974b and 984a, 984b, respectively. For example, the shared cache may locally cache data stored in a memory 932, 934 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 970, 980, it is to be understood that the scope of the present invention is not so limited. In other embodiments, one or more additional processing elements may be present in a given processor. Alternatively, one or more of processing elements 970, 980 may be an element other than a processor, such as an ASIC chip or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro-architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

First processing element 970 may further include memory controller logic (MC) 972 and point-to-point (P-P) interfaces 976 and 978. Similarly, second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While MC logic 972 and 982 is illustrated as integrated into the processing elements 970, 980, for alternative embodiments the MC logic may be discrete logic outside the processing elements 970, 980 rather than integrated therein.

First processing element 970 and second processing element 980 may be coupled to an I/O subsystem 990 via P-P interconnects 976, 986 and 984, respectively. As shown in FIG. 9, I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple graphics engine 938 to I/O subsystem 990. Alternately, a point-to-point interconnect 939 may couple these components.

In turn, I/O subsystem 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which may couple first bus 916 to a second bus 910. In one embodiment, second bus 920 may be a low pin count (LPC) bus. Various devices may be coupled to second bus 920 including, for example, a keyboard/mouse 912, communication device(s) 926 (which may in turn be in communication with the computer network 202), and a data storage unit 928 such as a disk drive or other mass storage device which may include code 930, in one embodiment. The code 930 may include instructions for performing embodiments of one or more of the methods described above. Further, an audio I/O 924 may be coupled to second bus 920.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, visualization and analysis of complex network security data concepts are readily scalable and can be implemented across a large number of components, as well as more complicated/sophisticated arrangements and configurations. Accordingly, the examples provided should not limit the scope or inhibit the broad teachings of visualization and analysis of complex network security data as potentially applied to a myriad of other architectures.

It is also important to note that the functions related to visualization and analysis of complex network security data, illustrate only some of the possible visualization and analysis functions that may be executed by, or within, systems illustrated in FIGS. 2, 8, and 9. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although system of FIG. 2 and any other systems disclosed herein have been illustrated with reference to particular elements and operations that facilitate the visualization and analysis of complex network security data functions, these elements and operations may be replaced by any suitable architecture, protocols, and/or processes that achieve the intended functionality of the visualization and data analysis system.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., visualization display engine, foundation service, visualization data engine, and any components shown in FIG. 2, etc.) disclosed herein may also include a memory device (or memory element) for storing information to be used in achieving the functions as outlined herein. Additionally, the systems and devices (e.g., visualization display engine, foundation service, visualization data engine, and any components shown in FIG. 2, etc.) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein, such as data store(s) and data source(s), should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" and "data storage" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., visualization display engine, foundation service, visualization data engine, and any components shown in FIG. 2, etc.) can be provisioned as part of any type of network element. As used herein, the terms visualization display engine, foundation service, visualization data engine, and any components shown in FIG. 2 for enabling visualization and analysis of complex network security data can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices (e.g., visualization display engine, foundation service, visualization data engine, and any components shown in FIGS. 2, 8 and 9 having network connectivity or communication channel with another component) can include software to achieve (or to foster) the provision of visualization and analysis of complex network security data. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

The following examples pertain to some embodiments of the disclosure.

Example 1 is at least one machine readable non-transitory storage medium having instructions stored thereon for providing intelligent suggestions in visualizing network security data, wherein the instructions when executed by at least one processors cause the at least one processors to perform the following operations: retrieving the network security data from one or more data sources; rendering the network security data for display on a user interface as a first force-directed node graph using an energy function; applying principal component analysis on the network security data to identify a first set of principal components of the network security data; and outputting a first message to the user through the user interface suggesting a first filter based on the one or more principal components of the network security data.

In Example 2, the subject matter of Example 1 can optionally include the network security data comprising event counts (organized) by a network address.

In Example 3, the subject matter of Example 1 or 2 can optionally include the network security data comprising one or more of the following: machine asset information, network topology, reputation data, traffic logs, real-time event streams, malware detection data; employee records and organizational data.

In Example 4, the subject matter of any one of the Examples 1-3 can optionally include: receiving a first user input indicating a first acceptance to the first message suggesting the first filter; generating a first filtered network security data by filtering the network security data using a first set of one or more principal components of the network security data; and rendering the first filtered network security data for display on the user interface as a second force-directed node graph using the energy function.

In Example 5, the subject matter of Example 4 can optionally include: identifying a second set of principal components of the network security data; and outputting a second message to the user through the user interface suggesting a second filter based on the second set of principal components of the network security data.

In Example 6, the subject matter of Example 5 can optionally include: receiving a second user input indicating a second acceptance to the second message suggesting the second filter; generating a second filtered network security data by filtering the network security data using the second set of principal components of the network security data; and rendering the second filtered network security data for display on the user interface as a third force-directed node graph using the energy function.

In Example 7, the subject matter of any of the Examples 1-6 can optionally include applying principal component analysis on the network security data comprising: creating a coefficient matrix from the network security data, the coefficient matrix being a m×n matrix, where m correspond to events and n correspond to network addresses associated with those events, and the coefficient for each network address and event combination is a number equal to the number of times the combination occurred in the network security data; computing mean of coefficient matrix; centering the network security data into a centered data matrix based on the mean; performing singular value decomposition on the centered data matrix; and selecting a number of principal components to retain for analysis.

In Example 8, the subject matter of Example 7 can optionally include events corresponding to the m row variables of the coefficient matrix and network addresses corresponding to the n column variables of the coefficient matrix.

In Example 9, the subject matter of Example 7 or 8 can optionally include the number of principal components (e.g., the first set of principal components, the second set of principal components) being less than or equal to 12.

In Example 10, the subject matter of any of the Examples 7-9 can optionally include the number of principal components (e.g., the first set of principal components, the second set of principal components) being less than or equal to 9.

In Example 11, the subject matter of any of the Examples 7-10 can optionally include the number of principal components (e.g., the first set of principal components, the second set of principal components) is less than or equal to 7.

In Example 12, the subject matter of any of the Example 1-11 can optionally include the energy function comprising: model equations for modeling electrostatic forces between data points; and a procedure for determining motion and position of the data points using the model equations, partial differential equations, and ordinary differential equations to determine the motion and position of nodes in the graph, wherein the equations are solved using 3-D Fast Fourier Transformations.

Example 13 is an apparatus for providing intelligent suggestions in visualizing network security data, the apparatus comprising: at least one memory element; at least one processors coupled to the at least one memory element; a visualization data engine that when executed by the at least one processors is configured to: retrieve the network security data from one or more data sources; process render the network security data using an energy function; and apply principal component analysis on the network security data to identify a first set of principal components of the network security data; and a visualization display engine that when executed by the at least one processors is configured to: render the network security data processed using the energy function for display on a user interface as a first force-directed node graph; output a first message to the user through the user interface suggesting a first filter based on the one or more principal components of the network security data.

In Example 14, the subject matter of Example 13 can optionally include the network security data comprising event counts organized by network addresses.

In Example 15, the subject matter of Example 13 or 14 can optionally include the network security data comprising one or more of the following: machine asset information, network topology, reputation data, traffic logs, real-time event streams, malware detection data; employee records and organizational data.

In Example 16, the subject matter of any of Examples 13-15 can optionally include the visualization data engine being further configured to generate a first filtered network security data by filtering the network security data using a first set of one or more principal components of the network security data; and the visualization display engine being further configured to: receive a first user input indicating a first acceptance to the first message suggesting the first filter; and render the first filtered network security data for display on the user interface as a second force-directed node graph using the energy function.

In Example 17, the subject matter of Example 16 can optionally include the visualization data engine being further configured to identify a second set of principal components of the network security data; and the visualization display engine being further configured to output a second message to the user through the user interface suggesting a second filter based on the second set of principal components of the network security data.

In Example 18, the subject matter of Example 17 can optionally include the visualization data engine being further configured to generate a second filtered network security data by filtering the network security data using the second set of principal components of the network security data; and the visualization display engine being further configured to: receiving a second user input indicating a second acceptance to the second message suggesting the second filter; and rendering the second filtered network security data for display on the user interface as a third force-directed node graph using the energy function.

In Example 19, the subject matter of any one of the Examples 13-18 can optionally include the visualization data engine being further configured to: create a coefficient matrix from the network security data, the coefficient matrix being a m×n matrix, where m correspond to events and n correspond to network addresses associated with those events, and the coefficient for each network address and event combination is a number equal to the number of times the combination occurred in the network security data; compute mean of coefficient matrix; center the network security data into a centered data matrix based on the mean; perform singular value decomposition on the centered data matrix; and select a number of principal components to retain for analysis (e.g., for use in a filter).

In Example 20, the subject matter of Example 19 can optionally include events corresponding to the m row variables of the coefficient matrix and network addresses corresponding to the n column variables of the coefficient matrix.

In Example 21, the subject matter of Example 19 or 20 can optionally include the number of principal components (e.g., the first set of principal components, the second set of principal components) being less than or equal to 12.

In Example 22, the subject matter of any one of the Examples 19-21, wherein the number of principal components (e.g., the first set of principal components, the second set of principal components) is less than or equal to 9.

In Example 23, the subject matter of any one of the Examples 19-22, wherein the number of principal components (e.g., the first set of principal components, the second set of principal components) is less than or equal to 7.

In Example 24, the subject matter of any one of the Examples 13-23 can optionally include the energy function comprising: model equations for modeling electrostatic forces between data points; and a procedure for determining motion and position of the data points using the model equations, partial differential equations, and ordinary differential equations to determine the motion and position of nodes in the graph, wherein the equations are solved using 3-D Fast Fourier Transformations.

Example 25 is a method for providing intelligent suggestions in visualizing network security data, the method comprising: retrieving and processing, using a visualization data engine, the network security data from one or more data sources using at least an energy function; rendering, using a visualization display engine, the network security data for display on a user interface as a first force-directed node graph using the energy function; applying, using the visualization data engine, principal component analysis on the network security data to identify a first set of principal components of the network security data; and outputting, using the visualization display engine, a first message to the user through the user interface suggesting a first filter based on the one or more principal components of the network security data.

In Example 26, the subject matter of Example 25 can optionally include the network security data comprising event counts (organized) by a network address.

In Example 27, the subject matter of Example 25 or 26 can optionally include the network security data comprising one or more of the following: machine asset information, network topology, reputation data, traffic logs, real-time event streams, malware detection data; employee records and organizational data.

In Example 28, the subject matter of any one of the Examples 25-27 can optionally include receiving, using the visualization display engine, a first user input indicating a first acceptance to the first message suggesting the first filter; generating, using the visualization data engine, a first filtered network security data by filtering the network security data using a first set of one or more principal components of the network security data; and rendering, using the visualization display engine, the first filtered network security data for display on the user interface as a second force-directed node graph using the energy function.

In Example 29, the subject matter of Example 28 can optionally include: identifying, using the visualization data engine, a second set of principal components of the network security data; and outputting, using the visualization display engine, a second message to the user through the user interface suggesting a second filter based on the second set of principal components of the network security data.

In Example 30, the subject matter of Example 29 can optionally include receiving, using the visualization display engine, a second user input indicating a second acceptance to the second message suggesting the second filter; generating, using the visualization data engine, a second filtered network security data by filtering the network security data using the second set of principal components of the network security data; rendering, using the visualization display engine, the second filtered network security data for display on the user interface as a third force-directed node graph using the energy function.

In Example 31, the subject matter of any one of the Examples 25-30 can optionally include applying principal component analysis on the network security data comprising: creating a coefficient matrix from the network security data, the coefficient matrix being a m×n matrix, where m correspond to events and n correspond to network addresses associated with those events, and the coefficient for each network address and event combination is a number equal to the number of times the combination occurred in the network security data; computing mean of coefficient matrix; centering the network security data into a centered data matrix based on the mean; performing singular value decomposition on the centered data matrix; and selecting a number of principal components to retain for analysis (e.g., for use in a filter).

In Example 32, the subject matter of Example 31 can optionally include events corresponding to the m row variables of the coefficient matrix and network addresses corresponding to the n column variables of the coefficient matrix.

In Example 33, the subject matter of Example 31 or 32 can optionally include the number of principal components (e.g., the first set of principal components, the second set of principal components) being less than or equal to 12.

In Example 34, the subject matter of any one of the Examples 31-33 can optionally include the number of principal components (e.g., the first set of principal components, the second set of principal components) being less than or equal to 9.

In Example 35, the subject matter of any one of the Examples 31-34 can optionally include the number of principal components (e.g., the first set of principal components, the second set of principal components) being less than or equal to 7.

In Example 36, the subject matter of any one of the Examples 25-35 can optionally include the energy function comprising: model equations for modeling electrostatic forces between data points; and a procedure for determining motion and position of the data points using the model equations, partial differential equations, and ordinary differential equations to determine the motion and position of nodes in the graph, wherein the equations are solved using 3-D Fast Fourier Transformations.

Example 37 is an apparatus for providing intelligent suggestions in visualizing network security data, the apparatus comprising: means for retrieving the network security data from one or more data sources; means for rendering the network security data for display on a user interface as a first force-directed node graph using an energy function; means for applying principal component analysis on the network security data to identify a first set of principal components of the network security data; and means for outputting a first message to the user through the user interface suggesting a first filter based on the one or more principal components of the network security data.

Example 38 is an apparatus for providing intelligent suggestions in visualizing network security data, the apparatus comprising means for performing the method described in any one of the Examples 25-36.

In Example 39, the subject matter of Example 38 can optionally include the means for performing the method comprising at least one processors and at least one memory element.

In Example 40, the subject matter of Example 39 can optionally include the at least one memory element comprising machine readable instructions that when executed, cause the apparatus to perform the method described in any one of the Examples 25-36.

In Example 41, the subject matter of any one of the Examples 38-40 can optionally include the apparatus being a computing device.

Example 42 is at least one machine readable storage medium comprising instructions providing intelligent suggestions in visualizing network security data, wherein the instructions when executed implement a method or realize an apparatus as described in any one of the Examples 13-41.

What is claimed is:

1. At least one machine readable non-transitory storage medium having instructions stored thereon for providing intelligent suggestions in visualizing network security data, wherein the instructions when executed by at least one processors cause the at least one processors to perform the following operations:
retrieving the network security data from one or more data sources;
rendering the network security data for display on a user interface as a first force-directed node graph, wherein the first force-directed node graph has the network security data as nodes whose motion and position information are computed using an energy function;
applying principal component analysis on the network security data to reduce dimensionality of the network security data and identify a first set of principal components of the network security data; and
outputting a first message to the user through the user interface suggesting a first filter on the network security data based on the one or more principal components of the network security data.

2. The at least one machine readable non-transitory storage medium of claim 1, wherein the network security data comprises event counts by a network address.

3. The at least one machine readable non-transitory storage medium of claim 1, wherein the network security data comprises one or more of the following: machine asset information, network topology, reputation data, traffic logs, real-time event streams, malware detection data; employee records and organizational data.

4. The at least one machine readable non-transitory storage medium of claim 1, wherein the operations further comprises:
receiving a first user input indicating a first acceptance to the first message suggesting the first filter;
generating a first filtered network security data by filtering the network security data using a first set of one or more principal components of the network security data; and
rendering the first filtered network security data for display on the user interface as a second force-directed node graph using the energy function.

5. The at least one machine readable non-transitory storage medium of claim 4, wherein the operations further comprises:
identifying a second set of principal components of the network security data; and
outputting a second message to the user through the user interface suggesting a second filter based on the second set of principal components of the network security data.

6. The at least one machine readable non-transitory storage medium of claim 5, wherein the operations further comprises:
receiving a second user input indicating a second acceptance to the second message suggesting the second filter;
generating a second filtered network security data by filtering the network security data using the second set of principal components of the network security data; and
rendering the second filtered network security data for display on the user interface as a third force-directed node graph using the energy function.

7. The at least one machine readable non-transitory storage medium of claim 1, wherein applying principal component analysis on the network security data comprises:
creating a coefficient matrix from the network security data, the coefficient matrix being a m×n matrix, where m correspond to events and n correspond to network addresses associated with those events, and the coefficient for each network address and event combination is a number equal to the number of times the combination occurred in the network security data;
computing mean of coefficient matrix;
centering the network security data into a centered data matrix based on the mean;
performing singular value decomposition on the centered data matrix; and
selecting a number of principal components to retain for analysis.

8. The at least one machine readable non-transitory storage medium of claim 7, wherein events correspond to the m row variables of the coefficient matrix and network addresses correspond to the n column variables of the coefficient matrix.

9. The at least one machine readable non-transitory storage medium of claim 7, wherein the number of principal components is less than or equal to 12.

10. The at least one machine readable non-transitory storage medium of claim 7, wherein the number of principal components is less than or equal to 9.

11. The at least one machine readable non-transitory storage medium of claim 7, wherein the number of principal components is less than or equal to 7.

12. The at least one machine readable non-transitory storage medium of claim 1, wherein the energy function comprises:
- model equations for modeling electrostatic forces between data points; and
- a procedure for determining the motion and position of the data points using the model equations, partial differential equations, and ordinary differential equations to determine the motion and position of nodes in the graph, wherein the equations are solved using 3-D Fast Fourier Transformations.

13. An apparatus for providing intelligent suggestions in visualizing network security data, the apparatus comprising:
- at least one memory element;
- at least one processors coupled to the at least one memory element;
- a visualization data engine that when executed by the at least one processors is configured to:
  - retrieve the network security data from one or more data sources;
  - determine motion and position information of the network security data as nodes in a first force-directed node graph; and
  - apply principal component analysis on the network security data to reduce dimensionality of the network security data and identify a first set of principal components of the network security data; and
- a visualization display engine that when executed by the at least one processors is configured to:
  - render the first force-directed node graph for display on a user interface; and
  - output a first message to the user through the user interface suggesting a first filter on the network security data based on the one or more principal components of the network security data.

14. The apparatus of claim 13, wherein the network security data comprises event counts organized by network addresses.

15. The apparatus of claim 13, wherein:
- the visualization data engine is further configured to generate a first filtered network security data by filtering the network security data using a first set of one or more principal components of the network security data; and
- the visualization display engine is further configured to:
  - receive a first user input indicating a first acceptance to the first message suggesting the first filter; and
  - render the first filtered network security data for display on the user interface as a second force-directed node graph using the energy function.

16. A computerized method for providing intelligent suggestions in visualizing network security data, the method comprising:
- retrieving and processing, using a visualization data engine implemented in one or more processors, the network security data from one or more data sources using at least an energy function to determine motion and position information of the network security data as nodes in a first force-directed node graph;
- rendering, using a visualization display engine implemented in one or more processors, the first force-directed node graph for display on a user interface;
- applying, using the visualization data engine implemented in one or more processors, principal component analysis on the network security data to identify a first set of principal components of the network security data; and
- outputting, using the visualization display engine implemented in one or more processors, a first message to the user through the user interface suggesting a first filter on the network security data based on the one or more principal components of the network security data.

17. The method of claim 16, wherein applying principal component analysis on the network security data comprises:
- creating a coefficient matrix from the network security data, the coefficient matrix being a m×n matrix, where m correspond to events and n correspond to network addresses associated with those events, and the coefficient for each network address and event combination is a number equal to the number of times the combination occurred in the network security data;
- computing mean of coefficient matrix;
- centering the network security data into a centered data matrix based on the mean;
- performing singular value decomposition on the centered data matrix; and
- selecting a number of principal components to retain for analysis.

18. The method of claim 17, wherein events correspond to the m row variables of the coefficient matrix and network addresses correspond to the n column variables of the coefficient matrix.

19. The method of claim 17, wherein the number of principal components is less than or equal to 9.

20. The method of claim 16, wherein the energy function comprises:
- model equations for modeling electrostatic forces between data points; and
- a procedure for determining the motion and position of the data points using the model equations, partial differential equations, and ordinary differential equations to determine the motion and position of nodes in the graph, wherein the equations are solved using 3-D Fast Fourier Transformations.

* * * * *

UNITED STATES PATENT AND TRADEMARK OFFICE
CERTIFICATE OF CORRECTION

PATENT NO.          : 9,591,028 B2                              Page 1 of 1
APPLICATION NO.     : 14/780533
DATED               : March 7, 2017
INVENTOR(S)         : Grant Babb et al.

It is certified that error appears in the above-identified patent and that said Letters Patent is hereby corrected as shown below:

On the Title Page

In item (74), in Column 2, in "Attorney, Agent, or Firm", Line 1, delete "Captial" and insert -- Capital --, therefor.

In the Drawings

On sheet 2 of 11, in Figure 2, reference Numeral 204, Line 4, delete "SERVELTS" and insert -- SERVLETS --, therefor.

On sheet 2 of 11, in Figure 2, reference Numeral 210, Line 1, delete "CSR/DATABSE" and insert -- CSR/DATABASE --, therefor.

Signed and Sealed this
Second Day of May, 2017

Michelle K. Lee
*Director of the United States Patent and Trademark Office*